Patented July 24, 1951

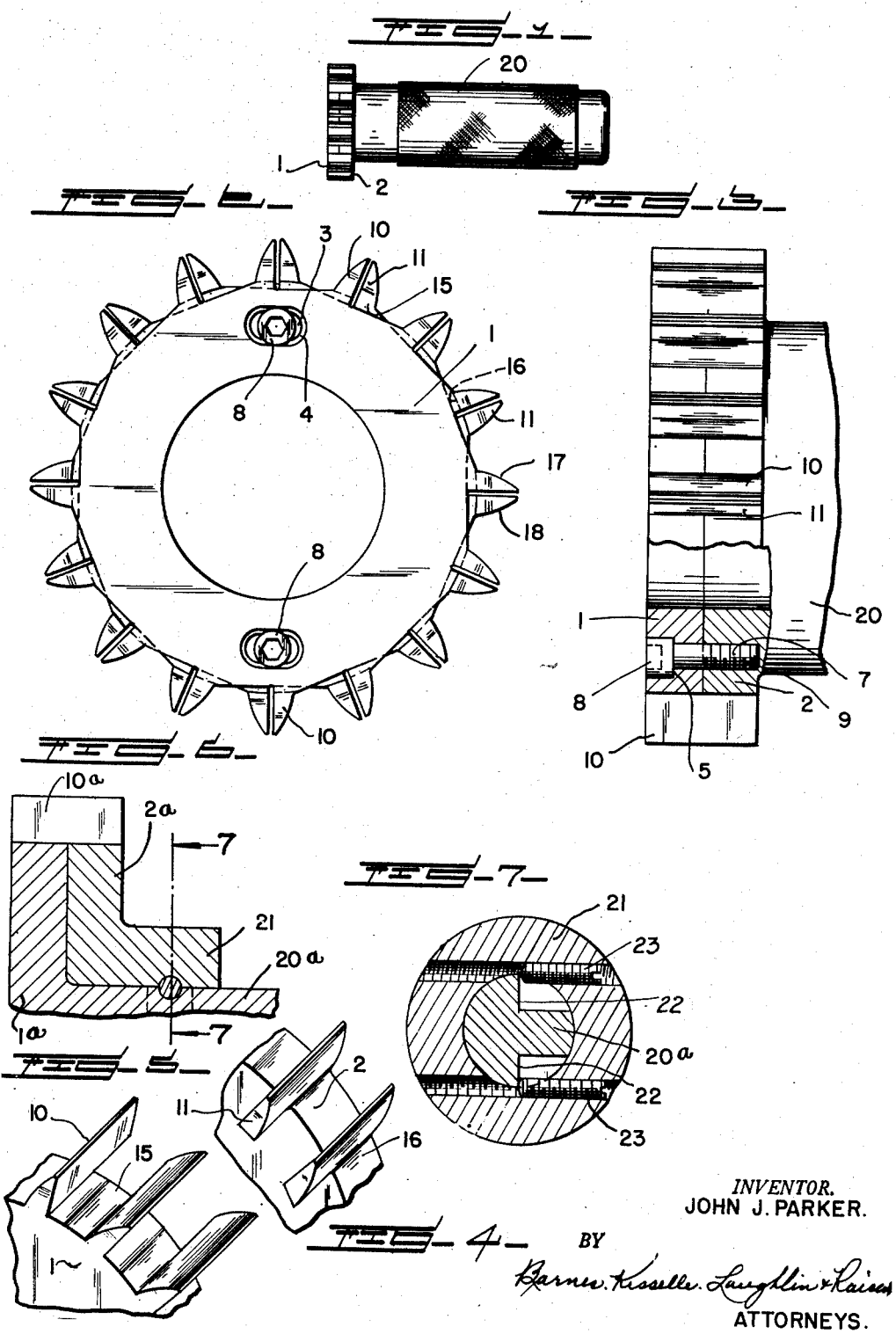

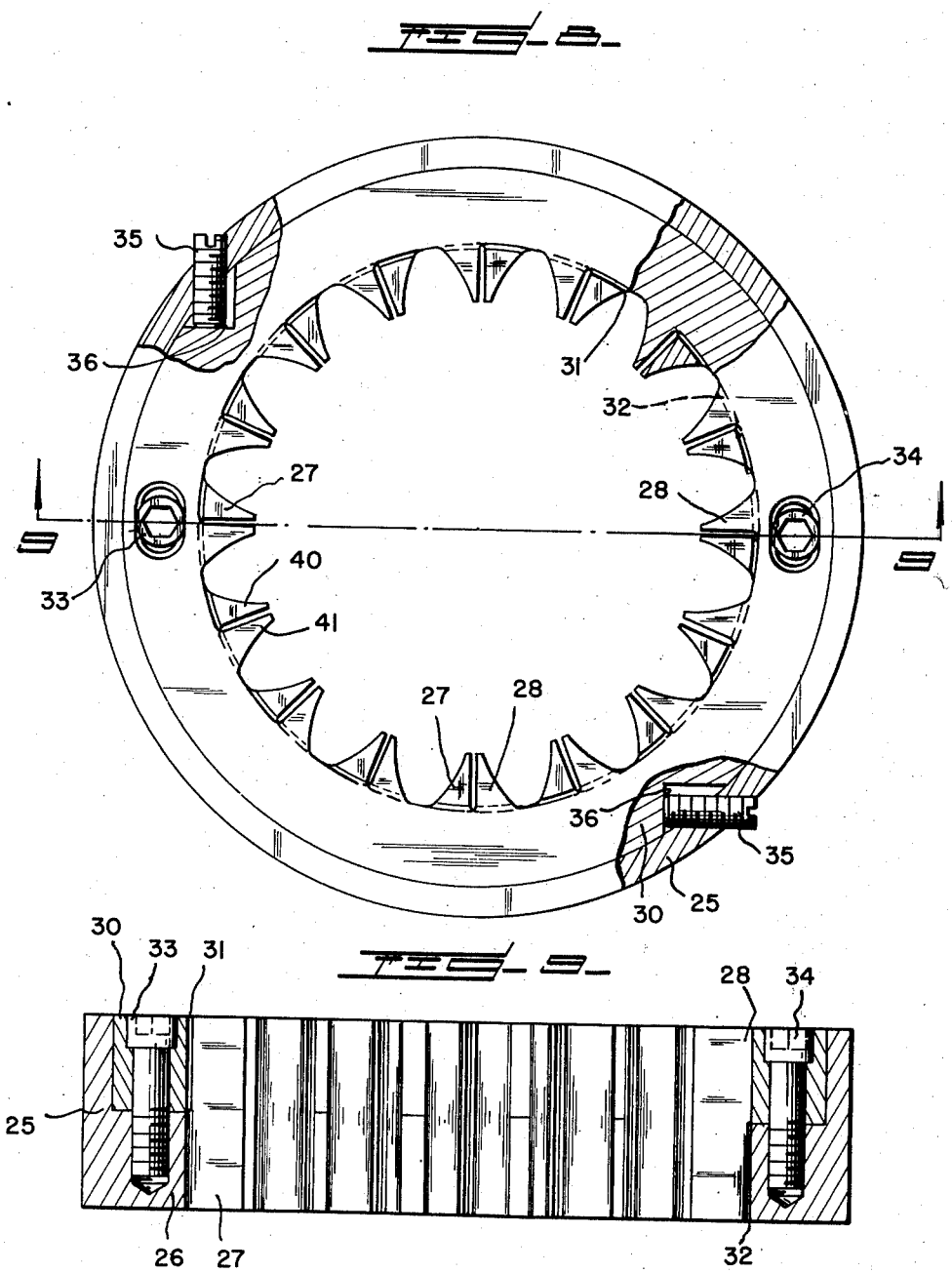

2,561,533

UNITED STATES PATENT OFFICE 2,561,533

ADJUSTABLE TOOTH GAUGE

John J. Parker, Detroit, Mich.

Application May 31, 1946, Serial No. 673,500

2 Claims. (Cl. 33—179.5)

This invention relates to a gauge and it has to do particularly with a gauge for use in checking and inspecting gears and splines and similar toothed devices.

A gauge in the form of a gear of precision dimensions for checking a ring gear or the like having internal teeth is frequently called a plug gauge. In checking an internally toothed gear the gauge is inserted into the gear by relative axial movement and the teeth on the gauge are to properly pass into and interfit between the teeth of the internal gear. A similar gauge for checking a gear with external teeth is constructed with precision dimensions with internal teeth so that the gear is passed into the gauge with relative axial movement with the teeth of the gear and the gauge interfitting. The checking is accomplished by ascertaining a proper interfitting of the gauge and gear. For clearness and brevity the description will be made with reference to gears although the gauge may be used for the other mentioned toothed devices.

Such gauges are costly in that they must be made with such close precision and separate gauges are needed for checking as many different sizes of gears. Some gear diameters may be the same but they may employ different numbers of teeth with the teeth varying in thickness and with the spacing between the teeth varying.

The principal object of the present invention is to provide a gauge of the type referred to which has the flexible characteristics in that a single gauge may be used to check gears of different dimensions. Needless to say, if a single gauge can be provided for checking a number of different sizes of gears, that a commendable savings is effected. In carrying out the invention the gauge is made with at least two complementary and interfitting portions. These portions are each provided with what may be termed partial gauging teeth and when the parts are interfitted together the partial teeth cooperate in pairs to provide full gauging teeth. The construction is such that the partial teeth overlap each other for the full axial width of the gauging instrument so that the teeth of the gear may be gauged throughout their axial extent. The complemental portions of the gauge are relatively adjustable on their axis so that the partial teeth may be adjusted toward and away from each other. Thus, a gauge may be set in any one of adjusted positions to be used for checking gears of varying specifications.

The accompanying drawings illustrate both an external and an internal gauge constructed in accordance with the invention:

Fig. 1 is a general side elevational view of what is sometimes called a plug gauge for checking an internal gear.

Fig. 2 is an enlarged end view showing the complemental gauging teeth.

Fig. 3 is a view partly in side elevation and partly in section.

Fig. 4 is a perspective view showing some of the structure of one complemental gauge part.

Fig. 5 is a perspective view showing some of the structure of the cooperating complemental part.

Fig. 6 is a detail sectional view showing an arrangement for adjusting the complemental portions.

Fig. 7 is a sectional view taken substantially on line 7—7 of Fig. 6 showing adjusting features.

Fig. 8 is a view illustrating a gauge for use in checking a gear with external teeth showing parts cut away and parts in section.

Fig. 9 is a sectional view taken substantially on line 9—9 of Fig. 8.

With reference to Figs. 2 and 3 the two complemental parts have ring-like body portions 1 and 2 adapted to be disposed in face to face relationship. These body portions are arranged to be adjustably connected together and a simple means for providing such adjustable connection is shown in Figs. 2 and 3. This means resides in screws as indicated. The body 1, for example, is provided with an elongated aperture 3 with a countersunk or recessed portion 4 which provides a shoulder 5. The screw, generally illustrated at 7, has a head portion 8 which lies in the counterbored portion 4 and is arranged to seat upon the shoulder 5 shown in Fig. 3. The end of the screw opposite the head is threaded as at 9 and its threads engage the interior threads of cooperating apertures in the body 2 as shown. These screws are advantageously of the type having a recessed head for receiving a turning tool. It will be appreciated how, by loosening the screws, that the two rings may be rotatably adjusted relative to each other and how the two are bound together when the screws are tightened.

The two body members are each provided with partial gauging teeth. As illustrated in Figs. 2 and 5 the ring 1 is provided with a series of partial teeth indicated at 10. The body 2 is provided with complementary partial gauging teeth 11. As shown in Figs. 4 and 5 the teeth 10 on the body 1 and the teeth 11 on the body 2 have parts contiguous with the respective bodies and parts which project axially therefrom a distance substantially equal to the axial width of the complemental member. The two members are placed together with a telescoping action with the projecting portions of the teeth 10 telescoping over peripheral portions of the body 2 and the projecting portions of the teeth 11 projecting over peripheral portions of the body 1. This is preferably an accurate telescoping fit for which purpose the body 1 is provided with accurate surfaces 15 upon which the teeth 11 nicely fit while the body 2 has complementary surfaces 16 upon which the projecting portions of the teeth 10 fit.

The complemental tooth portions, when the two members are secured together, appear substantially as shown in Fig. 2 where it will be noted that the portions are spaced slightly. By loosening the screws 8, the ring body members may be rotatably adjusted to thereby adjust the complemental teeth 10 and 11 toward and away from each other. It will be noted that the complemental teeth 10 and 11 are formed with the desired or proper form or curvature on their exterior or remote surfaces shown at 17 and 18, while their adjacent faces may be substantially radial. Accordingly, the complemental parts may be adjusted accurately to determine the overall effective width of the complemental gauging tooth. This adjustment is to be made when the tool is to be used for gauging or inspecting gears of known construction and it may be changed or varied when the tool is to be used with gears of other specifications. One of the members, such as the body 2, may be provided with a suitable handle 20 as shown in Figs. 1 and 3 by which the gauge may be manipulated.

A structure for adjusting two members of such a tool is shown in the modified forms illustrated in Figs. 6 and 7. In this form, the body 1a is provided with teeth 10a and an extending axis or pintle member 20a which also may serve as a handle. The body 2a is provided with a hub portion 21 which fits over the extension 20a. As illustrated in Fig. 7 the pintle portion 20a has segments removed therefrom to thus provide oppositely facing shoulders 22 while the hub 21 is drilled and tapped for the reception of screws 23. The ends of these screws abut the shoulders 22. It will be appreciated how, by manipulating the screws, a relative rotary adjustment is made.

A gauge for a gear with external teeth is shown in Figs. 8 and 9. In this form one complemental member has an outer flange 25 with a body portion 26 which carries an internal partial tooth 27. The complemental body is ring-like in form, as shown at 30, and is arranged to telescope within the flange 25 and butt against the body portion 26. The portion 30 is provided with complemental partial teeth 28.

It will be noted that, in this case, the teeth 27 overlap the interior of the body 30 while the teeth 28 project to overlap the interior of the portion 26. In view of the fact that the two body members may be accurately assembled together with the ring body 30 fitting accurately within the flange 25, the projecting portions of the complemental partial teeth may be spaced from the complemental member as shown at 31 and 32. Screws of the type above described, as shown at 33 and 34, may pass through the body member 30 and are threaded into the portion 26 of the complemental member. In addition to this construction, the two complemental parts may be arranged for adjustment as by means of thrust screws 35. In this construction, the member 30 has portions cut away to provide shoulders 36 while the screws 35 are threaded into and through the flange or rim 25 of the complemental member. To make an adjustment with this construction, the screws 33 and 34 are loosened and the screws 35 then manipulated for the proper adjustable positioning of the complimental members following which the screws 33 and 34 may be tightened. In this form the remote faces of the complemental teeth are provided with the proper curvature which are of concave form as shown at 40 and 41 for the gauging of the exterior teeth of the gears.

I claim:

1. A gauge for gears or the like comprising two complemental gauge members of ring-like form, one member having a body portion and an outer peripheral flange projecting axially therefrom, said one member having partial gauging teeth with parts contiguous with the inner surface of the body and with parts projecting axially from the body in the direction of the projection of the flange, the other member having a body adapted to fit within the peripheral flange and abut against the body of the first member, said other ring member having partial gauging teeth on its inner surface having parts contiguous with the inner portion of the body and parts projecting axially therefrom so as to lie within the ring-like body of the first member, said partial teeth on the two members being so arranged and constructed as to act in pairs to provide gauging tooth structures of substantially uniform conformation throughout the axial extent thereof, and means for connecting the complemental members together for relative rotational adjustment to vary the effective width of the gauging teeth structures.

2. A gauge for work pieces such as gears or the like comprising, two complemental gauge members, one member having a body portion of ring-like form and having an annular portion projecting axially therefrom, said one member having a plurality of partial gauging teeth with parts contiguous with the ring-like body portion and with parts projecting axially from the ring-like body portion, the other member being rotatably mounted in the annular projecting portion of the first named member and having a body portion of ring like form, said other member having a plurality of partial gauging teeth having parts contiguous with the body portion thereof and parts projecting axially therefrom, the projecting parts of the partial teeth on the two members being telescopingly disposed relative to the body portion of the other member, said partial teeth on the two members being disposed in pairs with each pair providing a substantially full gauging tooth of substantially uniform conformation throughout the axial extent thereof and adapted to enter and gauge the space between adjacent teeth of a work piece gear, and means for connecting the two members together against axial displacement and for rotatably adjusting the two members to vary effective width of the gauging teeth structures.

JOHN J. PARKER.

REFERENCES CITED

The following references are of record in the file of this patent:

UNITED STATES PATENTS

| Number | Name | Date |
| --- | --- | --- |
| 717,976 | Dodge | Jan. 6, 1903 |
| 994,896 | Willson | June 13, 1911 |
| 1,576,369 | Schooling | Mar. 9, 1926 |
| 2,100,056 | Klamp | Mar. 23, 1937 |
| 2,445,184 | Parker | July 13, 1948 |

FOREIGN PATENTS

| Number | Country | Date |
| --- | --- | --- |
| 522,139 | France | July 25, 1921 |
| 601,612 | Germany | Aug. 20, 1934 |
| 464,875 | Great Britain | Apr. 27, 1937 |